United States Patent [19]

Kiefer

[11] 4,350,869

[45] Sep. 21, 1982

[54] METHOD OF AUTOMATICALLY WELDING WITH A NON-CONSUMABLE ELECTRODE

[75] Inventor: Joseph H. Kiefer, Tampa, Fla.

[73] Assignee: The United States of America as represented by the United States Department of Energy, Washington, D.C.

[21] Appl. No.: 175,604

[22] Filed: Aug. 6, 1980

[51] Int. Cl.³ .............................................. B32K 9/10
[52] U.S. Cl. ........................... 219/137 R; 219/124.03; 219/137.71
[58] Field of Search .......... 219/137 R, 124.03, 137.71, 219/75

[56] References Cited

U.S. PATENT DOCUMENTS

| | | | |
|---|---|---|---|
| 2,723,331 | 11/1955 | Tyrner | 219/137.71 |
| 3,989,921 | 11/1976 | Ohi et al. | 219/124.03 |
| 4,088,866 | 5/1978 | Lund et al. | 219/137 R |
| 4,162,389 | 7/1979 | Shimdada et al. | 219/75 |

FOREIGN PATENT DOCUMENTS 52-58039  5/1977  Japan .............................. 219/137.71

Primary Examiner—C. C. Shaw
Attorney, Agent, or Firm—F. J. Baehr, Jr.

[57] ABSTRACT

A method for maintaining a constant arc gap between the electrode and the weld puddle by controlling the addition of filler wire based on the arc voltage.

1 Claim, 1 Drawing Figure

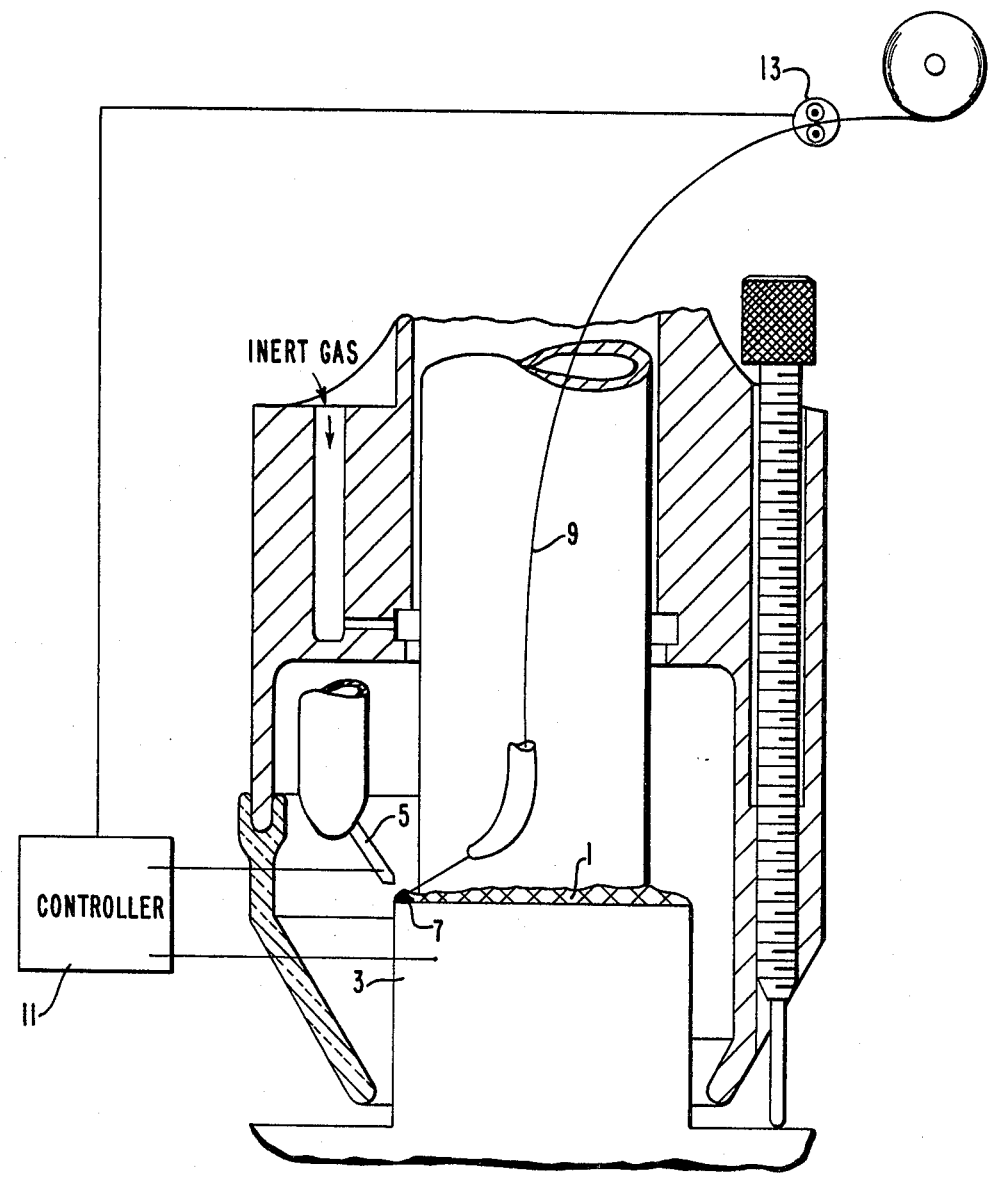

METHOD OF AUTOMATICALLY WELDING WITH A NON-CONSUMABLE ELECTRODE

BACKGROUND OF THE INVENTION

This invention relates to a method of automatically welding utilizing a non-consumable electrode with inert gas shielding, and more particularly, to a method utilizing arc voltage to control the rate at which filler wire is added to the weld.

Manually controlled, automatic welding devices have been developed for making repair to inaccessible areas utilizing fiber optic systems to observe the weld so that the operator can control the travel speed of the torch and the rate at which filler wire is added depending on the appearance of the weld puddle.

Automatic voltage control systems herebefore utilized moved the electrode with respect to the puddle to maintain a constant arc voltage and prevent contamination of the electrode with filler metal or improper bead shape.

Repair welding of locally removed defects in automatic welding processes is commonly done manually. Automatic equipment can be applied to do the rewelding, but wire addition proposes a programming problem. The present alternatives are to activate and deactivate the filler wire manually or to program the equipment to apply filler wire at the specific location and in the required amount. The manual repair relies on operator skill and his ability to closely observe the weld puddle as it proceeds into an area requiring filler metal and to reprogram a programmable welding apparatus is presently not in the skill of ordinary programmers.

SUMMARY OF THE INVENTION

In general, a method of laying down a weld bead over a predetermined path on a workpiece utilizing a non-consumable electrode and inert gas blanketing, when performed in accordance with this invention, comprises the steps of positioning the non-consumable electrode a fixed distance from the workpiece, moving the non-consumable electrode over the predetermined path at a predetermined rate which maintains the fixed distance from the workpiece, establishing an arc between the non-consumable electrode and the workpiece so as to form a weld puddle of molten metal on the workpiece, and adding filler metal to the well puddle at a rate necessary to prevent contamination of the non-consumable electrode with filler metal.

BRIEF DESCRIPTION OF THE DRAWINGS

The objects and advantages of this invention will become more apparant by reading the following detailed description in conjunction with the accompanying drawings, in which:

The sole FIGURE is a partial sectional view of welding apparatus disposed on a workpiece and adapted to the method set forth hereinafter.

DESCRIPTION OF THE PREFERRED EMBODIMENT

A method for laying down a weld bead 1 over a predetermined path on a workpiece 3 comprises the steps of positioning a tungsten or non-consumable electrode 5 a fixed distance from the workpiece 3;

moving the electrode 5 over a predetermined path at a predetermined rate that may be varied, while maintaining the fixed distance between the electrode 5 and the workpiece 3;

establishing an arc between the electrode 5 and the workpiece 3 so as to form a weld puddle 7 of molten metal on the workpiece;

blanketing the weld puddle 7 with inert gas; and adding filler metal or wire 9 to the weld puddle and controlling the addition of filler metal or wire 9 so as to maintain a generally constant arc voltage between the electrode 5 and the weld puddle 7.

The method herebefore described is performed utilizing an electronic feedback system 11, which automatically controls the amount of filler metal 9 added to the weld puddle 7 by sensing the proximity of the weld puddle 7 to the tungsten electrode 5 by comparing the arc voltage to a predetermined reference voltage.

The height of the weld puddle 7 can be controlled by controlling the amount of filler metal 9 added to the weld puddle 7. This can be accomplished by turning off a filler wire feed 13 when the arc voltage is lower than a predetermined value and turning it on when the arc voltage is greater than the predetermined value. The filler metal or wire feed 13 can be set at any rate below that which would cause stubbing of the wire into the puddle bottom and above that which is required to keep up with the travel speed of the electrode 5. Alternatively, the rate at which filler metal is added to the weld puddle could be made proportional to the voltage above a predetermined level and zero when the voltage is at or below the predetermined level utilizing a servo-controlled system for feeding the filler metal to the weld puddle. The electrode 5 is maintained at a fixed distance with respect to the workpiece 3 to maintain a constant gap between the electrode 5 and the weld puddle 7 and therefore a constant weld metal throat regardless of the arc's travel speed and current.

What is claimed is:

1. A method of laying down at least a portion a weld bead over a predetermined path on a workpiece utilizing a non-consumable electrode and inert gas blanketing, said method comprising the steps of:

positioning the non-consumable electrode a fixed distance from the workpiece;

moving the non-consumable electrode over the predetermined path at a predetermined rate while maintaining the fixed distance from the workpiece;

establishing an arc between the non-consumable electrode and the workpiece so as to form a weld puddle of molten metal on the workpiece; and only adding filler metal to the weld puddle when the arc voltage rises above a predetermined level and only adding the filler metal at a rate necessary to maintain that predetermined arc voltage between the non-consumable electrode and the weld puddle, thereby preventing contamination of the non-consumable electrode with filler metal.

* * * * *